Oct. 12, 1926.

S. C. BENSON

ELECTRIC MOTOR

Original Filed Oct. 25, 1921

1,602,744

Inventor
S. C. Benson

Fisher Mason & Moore
Attorneys

Patented Oct. 12, 1926.

1,602,744

UNITED STATES PATENT OFFICE.

SAMUEL C. BENSON, OF HARRISVILLE, OHIO, ASSIGNOR OF ONE-FOURTH TO J. J. ROBY, OF CLEVELAND, OHIO, ONE-FOURTH TO R. W. MOORE, AND ONE-FOURTH TO L. S. MOSCRIP, BOTH OF ADENA, OHIO.

ELECTRIC MOTOR.

Original application filed October 25, 1921, Serial No. 510,322. Divided and this application filed April 16, 1923. Serial No. 632,284.

This invention relates to an improvement in electric motors, the general object being to provide a safety device to cut off the electric current for the motor and thereby stop the motor when the supply of oil in the motor journals, bearings or oil cups is inadequate or becomes exhausted.

Figure 1:
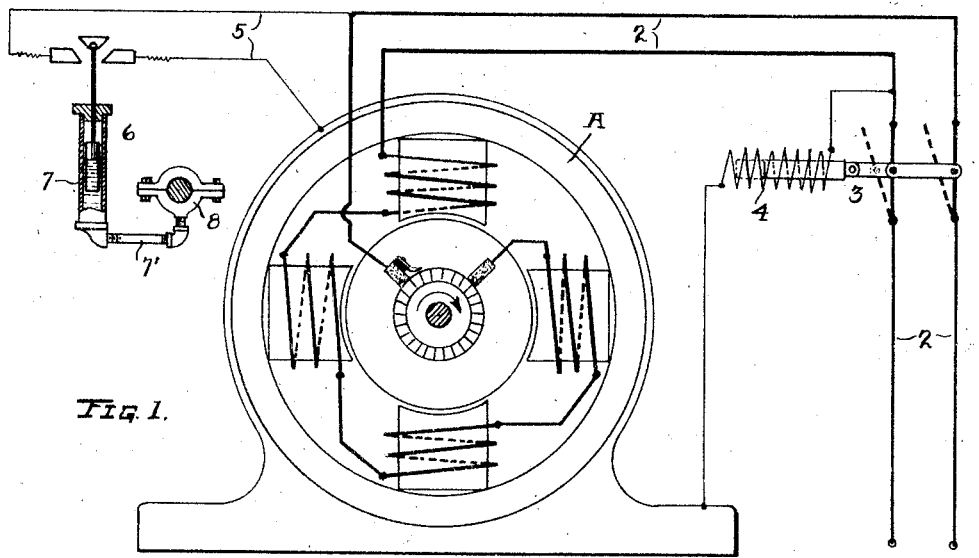
Figure 2:
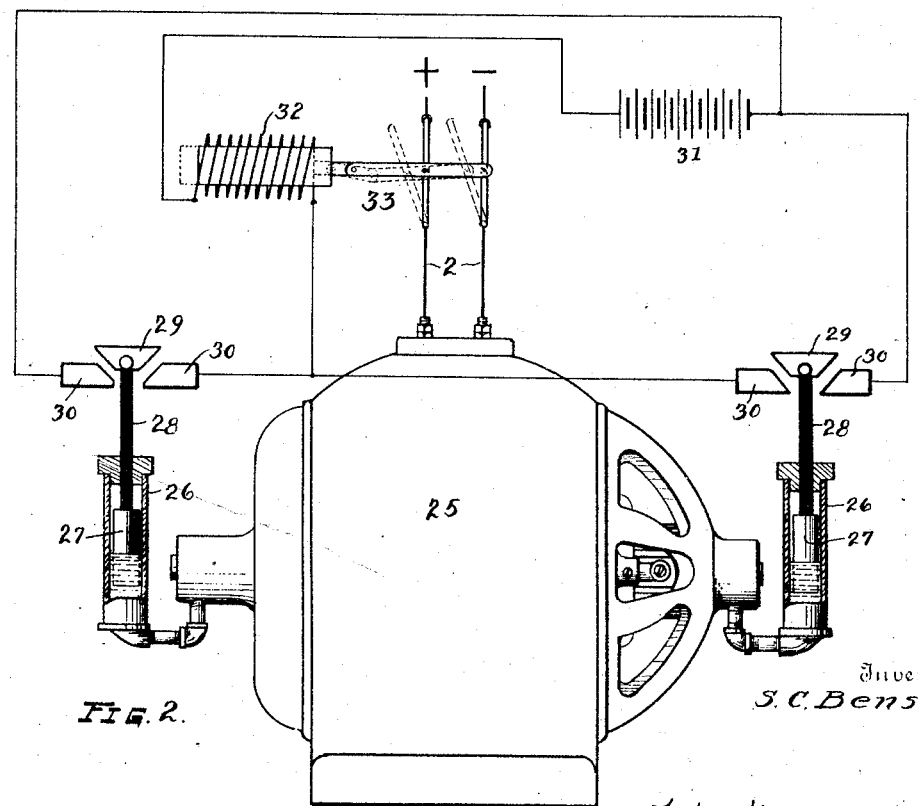

In the accompanying drawing, Fig. 1 is a diagrammatic view of a series wound motor and my improved safety oiling device electrically connected therewith. Fig. 2 is a diagrammatic view of a motor equipped with a pair of float-controlled switches electrically connected in parallel in an electric circuit having a magnetic switch adapted to control the electric current for the motor.

In Fig. 1 I show a series wound motor A having a main supply circuit 2 in which a double pole switch 3 is adapted to control the electric current supply. Switch 3 is a magnetically-operated switch comprising a coil 4 which is connected with the negative wire of circuit 2 and with the metal frame of motor A. Whenever coil 4 is energized switch 3 is opened instantly and the electric current is cut off from motor A. One way to energize coil 3 is to establish a shunt circuit through the frame of the motor, but only temporarily until magnetic switch 3 is closed. Thus, at the left of Fig. 1 I show a shunt circuit 5 controlled by a float operated gravity switch 6, which switch is held open as long as a predetermined amount of oil remains in the column or cup 7 attached by pipe 7' to the journal or bearing 8 of the motor. When the oil falls below a predetermined level the switch 6 drops and closes circuit 5 and a part of the current from the main circuit 2 is shunted through circuit 5 to the frame of the motor and thence through coil 4, in this way opening switch 3 to stop the motor and prevent injury to the bearings through lack of oil. Such a safety circuit and device is of value and utility where a motor is infrequently attended or used in remote or inaccessible places as in operating pumps in mines, etc.

In Fig. 2, I show a motor 25 having a pair of oil cups or oil supply columns 26—26 for the shaft bearings at opposite ends of the motor frame. These cups have floats 27 therein provided with insulated stems 28 surmounted by carbon contact blocks 29, and each block is adapted to drop upon a pair of contact members 30 connected in multiple with a battery 31 and the coil 32 of a magnetic switch 33 which is adapted to control main circuit 2 for motor 25. Depletion of the oil in either cup or column 26 will close the battery circuit and energize the coil 32 of magnetic switch 33 and open said switch, thereby stopping the motor. The present application is a division of my prior application for an improvement in electric motor protection, filed Oct. 25, 1921, Serial No. 510,322.

What I claim, is:

1. An electric motor having a bearing oiling device, a main supply circuit having therein a magnetically operated switch, a normally de-energized shunt circuit adapted to operate said magnetic switch, a second switch positioned within said shunt circuit and operated by the amount of oil within said device, said shunt circuit being adapted to momentarily energize said magnetic switch to cause its operation and the breaking of said main circuit.

2. An electric motor having a bearing oiling device, a main supply circuit having therein a magnetically operated switch, and a shunt circuit to said main circuit between the motor and switch, adapted to operate said magnetic switch and including a closing device governed by the amount of oil in the bearing, said shunt being adapted to be closed upon the operation of the closing device and broken upon the operation of said magnetic switch.

3. An electric motor having a bearing oiling device, a main supply circuit for said motor having therein a magnetically operated switch, a shunt circuit between the switch and motor, including a closing device operable upon the fall of oil within said device and adapted to operate said magnetic switch, said shunt circuit adapted to be momentarily closed upon the operation of the closing device and broken upon the operation of said magnetic switch.

In testimony whereof, I affix my signature hereto.

SAMUEL C. BENSON.